United States Patent [19]
Shimizu et al.

[11] Patent Number: 5,926,219
[45] Date of Patent: Jul. 20, 1999

[54] CONTROLLER FOR AN IMAGE SENSOR

[75] Inventors: Akira Shimizu, Ogaki; Yoshinari Kiriyama, Gifu-ken; Hajime Mizukami, Gifu; Hiromitsu Niwa, Ogaki, all of Japan

[73] Assignee: Sanyo Electric Company, Ltd., Osaka, Japan

[21] Appl. No.: 08/757,314

[22] Filed: Nov. 27, 1996

[30] Foreign Application Priority Data

Nov. 30, 1995 [JP] Japan ..................................... 7-312072

[51] Int. Cl.⁶ ..................................................... H04N 5/235
[52] U.S. Cl. .......................... 348/362; 348/296; 348/222
[58] Field of Search ................................... 348/207, 220, 348/221, 222, 223, 231, 233, 294, 295, 296, 297, 333, 334, 362, 363, 364, 552; 386/117; 396/233, 234, 96; 358/906, 909.1; H04N 5/235

[56] References Cited

U.S. PATENT DOCUMENTS 5,631,701  5/1997  Miyake ..................................... 348/552
5,734,425  3/1998  Takizawa et al. ....................... 348/231

*Primary Examiner*—Tuan V. Ho
*Attorney, Agent, or Firm*—Sheridan Ross P.C.

[57] ABSTRACT

A method of efficiently controlling an image sensing apparatus from a personal computer machine includes the steps of defining a control data file for storage of exposure data and image processing data to be supplied to the image sensing apparatus from the computer machine, storing initial values of the exposure data and the image processing data in the control data file, supplying the exposure data and the image processing data stored in the control data file to the image sensing apparatus, receiving the image data signals from the image sensing apparatus screen by screen and displaying the image data on a monitor screen, computing optimal values of the exposure data and the image processing data for each of a drive timing of the solid state image sensor and processing conditions of the image data signals based on the image data signals, and repeating the supply step, the display step, the computation step and the resetting step to display the image data on the monitor screen in a given period until a command to establish production of a specific image data signal is received.

6 Claims, 7 Drawing Sheets

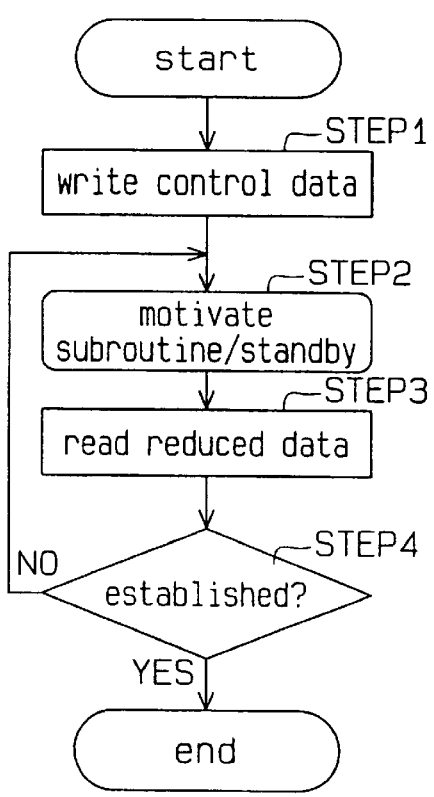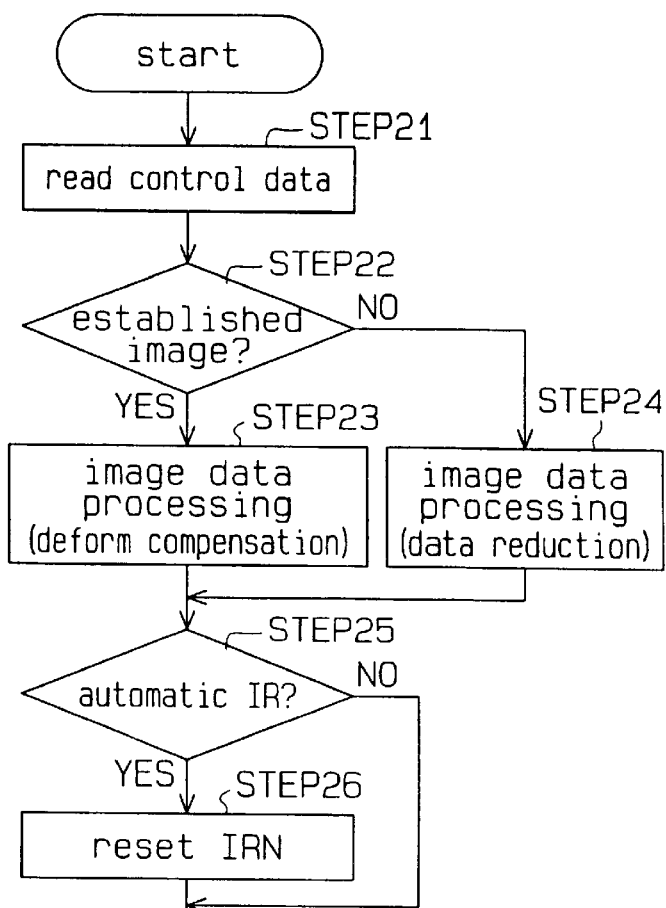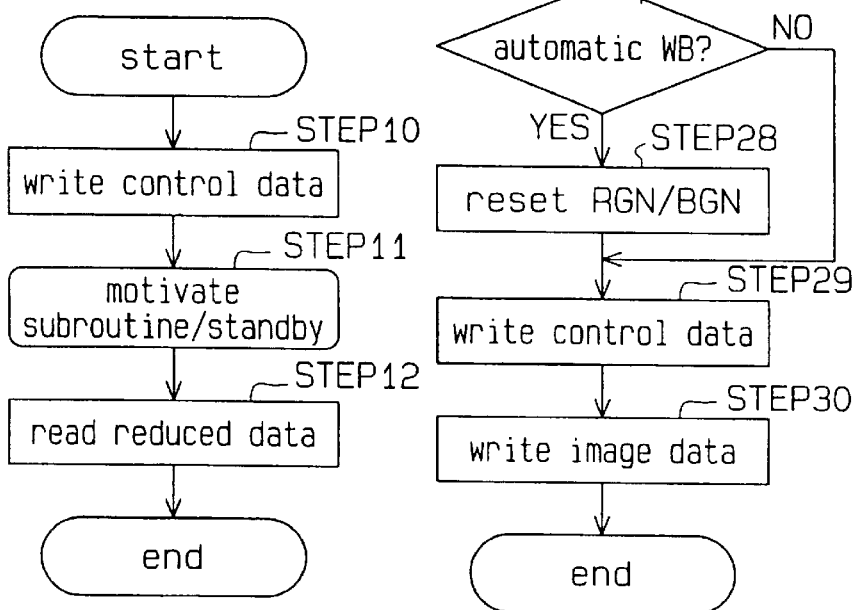

CONTROLLER FOR AN IMAGE SENSOR

BACKGROUND OF THE INVENTION

1. Field of the Invention

The present invention relates to a control method for an image sensing apparatus which is connected to a computer machine, and, more particularly, to an efficient control method for an image sensing apparatus, which is performed by a computer machine.

2. Description of the Related Art

An image sensing apparatus like an image scanner or a video camera to a computer machine, which includes a personal computer, a word processor, or the like to acquire image data signals. The image scanner scans over an original or an object to be scanned to acquire image data signals. The image sensing apparatus has a charge coupled device (CCD) solid state image sensor, which has a plurality of light receiving pixels arranged in a matrix form and can sense the image of a three-dimensional object. Such an image sensing apparatus and a computer machine are connected together using an expansion circuit board called a video capture unit. This video capture unit is installed in the computer machine to convert image data signals output from the image sensing apparatus into signals that can be processed by the computer machine. The converted signals are stored in a memory in the computer machine.

As shown in FIG. 1, a video capture unit 110 is provided between an image sensing apparatus 100 and a personal computer 120. The video capture unit 110 has a frame memory 111, a sync detector 112, a timing controller 113 and an interface circuit 114.

The frame memory 111 receives and stores digital image data signals D2(n) from the image sensing apparatus 100 screen by screen. A dual port type RAM capable of simultaneously writing and reading image data signals may be used for this frame memory 111. The sync detector 112 detects a sync signal included in the image data signal D2(n) and produces a timing pulse signal according to the vertical and horizontal scans based on the detection result.

The timing controller 113 receives the timing pulse signal from the sync detector 112 and a read instruction signal, which is supplied from the personal computer 120 via the interface circuit 114, and supplies write and read timing control signals to the frame memory 111. The timing controller 113 further supplies a transfer instruction signal for the image data signal to the interface circuit 115. In accordance with those control signals, the image data signals D2(n) are stored in the frame memory 111 screen by screen. At the same time, the image data signals D2(n) are read from the frame memory 111 screen by screen and are transferred via the interface circuit 114 to the personal computer 120. The timing controller 113 also sends an interrupt signal to the personal computer 120 via the interface circuit 114.

In accordance with a command entered through a keyboard and commands by the operation program, the personal computer 120 repeats processes, such as acquisition of image data signals, various arithmetic operations, access to the internal memory and screen display control, in a time-divisional manner.

The operational control of the image sensing apparatus by the personal computer 120 is accomplished by setting the conditions, such as the drive timing of the solid state image sensor and processes during the production of image data signals, on a software basis. The alteration of the set conditions therefore requires rewriting of program data. After program data is rewritten, the operation program is run again. An increase in control items for the image sensing apparatus complicates the setting of control conditions, which leads to a difficulty in setting the detailed items. Further, the increased number of control items impairs the responsiveness of the image sensing apparatus, thus making it difficult to confirm an operation that accords with the newly set control conditions.

SUMMARY OF THE INVENTION

Accordingly, it is a primary objective of the present invention to provide a method of efficiently controlling an image sensing apparatus from a personal computer side.

One aspect of the invention pertains to a method of controlling an image sensing apparatus from a computer machine. The image sensing apparatus has a solid state image sensor having a plurality of light receiving pixels arranged in a matrix form. The image sensor produces an image sensed output signal in accordance with a predetermined drive timing and performs signal processing on the image sensed output signal in accordance with predetermined processing conditions to thereby produce image data signals screen by screen. The method includes the steps of defining a control data file for storage of exposure data and image processing data to be supplied to the image sensing apparatus from the computer machine, the exposure data being used to designate a drive timing of the solid state image sensor, the image processing data being used to designate processing conditions for the image sensed output signal, storing initial values of the exposure data and the image processing data in the control data file, supplying the exposure data and the image processing data stored in the control data file to the image sensing apparatus, the solid state image sensor producing the image sensed output signal in accordance with the exposure data, the image sensing apparatus producing the image data signals in accordance with the image processing data, receiving the image data signals from the image sensing apparatus screen by screen and displaying image data on a monitor screen, computing optimal values of the exposure data and the image processing data for each of a drive timing of the solid state image sensor and processing conditions of the image data signals based on the image data signals, resetting the exposure data and the image processing data to the optimal values, and repeating the supply step, the display step, the computation step and the resetting step to display image data on the monitor screen in a given period until a command to establish production of a specific image data signal is received.

The display step may include a step of displaying image data in a reduced size in a partial area of the monitor screen, and the method further includes a step of, after establishment of production of a specific image data signal according to the image establishment command, displaying the established image data in an enlarged size on the monitor screen.

The image sensing apparatus may have a register for retaining at least one of the exposure data and the image processing data. The supply step may include a step of supplying at least one of the exposure data and the image processing data to the register.

Another aspect of the invention pertains to a recording medium having a control program for controlling an image sensing apparatus from a computer machine recorded thereon. The control program is readable by the computer machine and includes the steps of defining a control data file for storage of exposure data and image processing data to be supplied to the image sensing apparatus from the computer machine, the exposure data being used to designate a drive timing of the solid state image sensor, the image processing data being used to designate processing conditions for the image sensed output signal, storing initial values of the exposure data and the image processing data in the control data file, supplying the exposure data and the image processing data stored in the control data file to the image sensing apparatus, the solid state image sensor producing the image sensed output signal in accordance with the exposure data, the image sensing apparatus producing the image data signals in accordance with the image processing data, receiving the image data signals from the image sensing apparatus screen by screen and displaying image data on a monitor screen, computing optimal values of the exposure data and the image processing data for each of a drive timing of the solid state image sensor and processing conditions of the image data signals based on the image data signals, resetting the exposure data and the image processing data, stored in the control data file, to the optimal values, and repeating the supply step, the display step, the computation step and the resetting step to display image data on the monitor screen in a given period until a command to establish production of a specific image data signal is received.

The control program may further include a step of receiving the image data signals and displaying image data in an enlarged size on the monitor screen in response to a command for establishing production of a specific image data signal.

The present invention can be implemented in numerous ways including as an apparatus and a method.

Other aspects and advantages of the invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2A is a flowchart illustrating an image sensing control routine in a control method for an image sensing apparatus according to this invention, FIG. 2B is a flowchart illustrating a display control routine and FIG. 2C is a flowchart illustrating a subroutine;

DETAILED DESCRIPTION OF THE PREFERRED EMBODIMENT

FIGS. 2A to 2C are flowcharts illustrating a control method for an image sensing apparatus according to one embodiment of this invention, which is executed by a personal computer. FIG. 2A shows an image sensing control routine, FIG. 2B shows a display control routine and FIG. 2C shows a subroutine, which is executed in the control routine.

Figure 3:
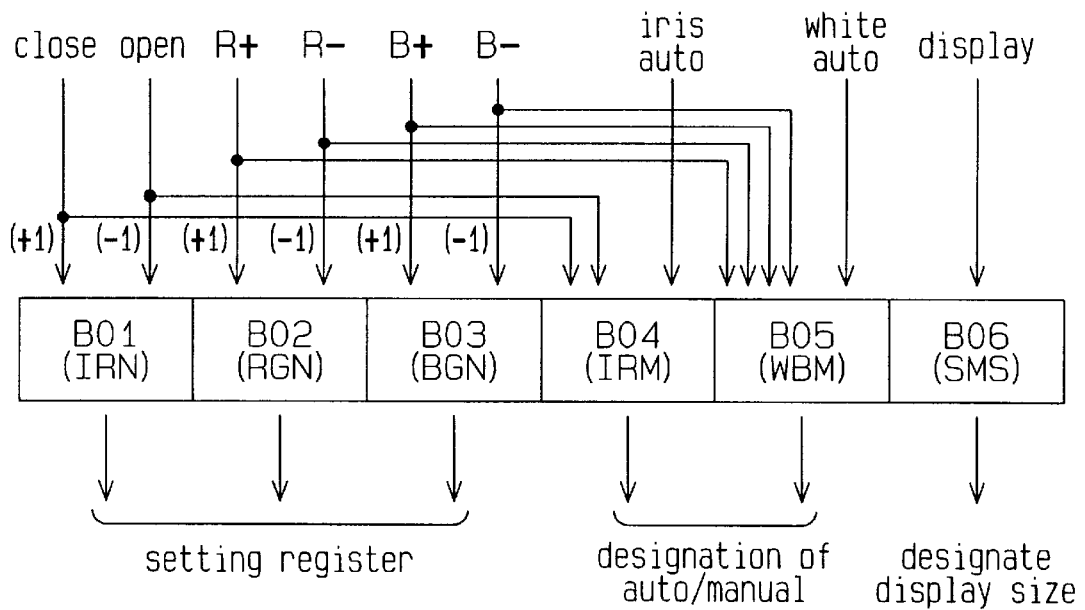
FIG. 3 is a diagram showing various kinds of control data to be stored in a control data file.

First, the image sensing control routine program is executed by a command instructing the initiation of image sensing. Then, numerical data (control data) for initialization is written in a control data file defined in the memory area in a personal computer in step 1. As shown in FIG. 3, for example, the control data file is divided into six areas B01 to B06 in which exposure control (iris control) data IRN, white balance control data RGN and BGN, manual designation data IRM and WBM and size designation data SMS are respectively stored. This control data file is previously stored in the memory space in the personal computer.

The exposure control data IRN defines the charge storage time of the solid state image sensor or the shutter speed and is expressed by a numeral corresponding to the shutter operation timing of the solid state image sensor. The two white balance control data RGN and BGN individually define the gates of the individual color components to adjust the color balance, and are expressed by numerals corresponding to the gains of R (red) and B (blue) components. In the initialization mode, the exposure control data IRN and white balance control data RGN and BGN are previously set to their standard values.

The two manual designation data IRM and WBM are associated with the designation of the manual or automatic execution of the exposure control and white balance control; "1" is stored to designate manual control, and "0" is stored to designate automatic control. In the initialization mode, the manual designation data IRM and WBM are both set to "0" for the designation of automatic control.

The size designation data SMS is associated with the designation of the display size for image data signals on the monitor screen; "1" is stored to designate the reduced size display for continuous display of plural pieces of image data in one screen and "0" is stored to designate the enlarged size display to display an established image. In the initialization mode, the size designation data SMS is set to "1" for the designation of the reduced size display.

After the initialization of the control data file is completed in step 1, a subroutine is initiated in step 2. In this subroutine process (the details of which will be given later), the exposure control data IRN, white balance control data RGN and BGN and the manual designation data IRM and WBM stored in the control data file are transferred to the image sensing apparatus to set specific operational conditions for the image sensing apparatus. Then, image data signals are input from the image sensing apparatus. The image data signals are stored in an exclusive data file defined in the memory area in the personal computer. In the next step 3, the image data signals are read from the image data file and image data is displayed on the monitor screen.

In step 4, the size designation data SMS stored in the control data file is checked. When the size designation data SMS designates the reduced size for continuous display, the flow returns to step 2 to repeat the subroutine process. When the size designation data SMS designates the enlarged size, the image sensing control routine is terminated. In the initialization, the size designation data SMS is set to "1".

Until the size designation data SMS "1" is rewritten to "0" in the display control routine to be discussed later, the activating of the subroutine and the reading and display of image data signals (steps 2, 3 and 4) are repeated. At this time, image data is displayed in a reduced size in a partial area of the monitor screen.

The display control routine program is executed first by a command to display an established image. Then, the size designation data SMS "1" stored in the control data file is written to "0" for the enlarged size designation in step 10. As the display control routine and the image sensing control routine operate independently, the image sensing control routine is terminated when the size designation data SMS is rewritten to "0".

In step 11, the same subroutine as is executed in the image sensing control routine is initiated. Specifically, after the operational conditions for the image sensing apparatus are set, image data signals are stored in the exclusive data file defined in the memory area in the personal computer. Subsequently, the image data signals stored in the image data file are read and image data is displayed on the monitor screen in step 12. The display control routine is then terminated.

The subroutine program is initiated by an activation command from the image sensing control routine program or the display control routine program. First, in step 21, the exposure control data IRN, white balance control data RGN and BGN, manual designation data IRM and WBM and size designation data SMS stored in the control data file are read out. In the next step 22, it is determined which size the size designation data SMS is designating, the reduced size for continuous display or the enlarged size for displaying an established image.

When the reduced size is designated, image data signals are partially thinned to produce reduced image data signals and a reduced image is displayed in a partial area on the monitor screen (reduction) in step 24. When the enlarged size is designated, deformation compensation is performed on image data signals by aspect ratio conversion to produce standard image data signals and an image is displayed fully on the monitor screen in step 23. Those image data signal processes are executed in the personal computer.

In step 25, it is determined which control the manual designation data IRM is designating, manual exposure control or automatic exposure control. When the automatic exposure control is designated, the optimal shutter speed is computed based on integral information for each frame of image data in step 26. The exposure control data IRN is rewritten so that the shutter operation is performed at the timing that matches with the computed shutter speed. When the manual exposure control is designated, the process in step 26 (rewriting of the exposure control data IRN) is not executed, but it is determined in step 27 whether the manual designation data WBM is designating manual or automatic white ba lance control.

When the automatic white balance control is designated, gains for the R component and B component for acquiring the optimal white balance are computed based on integral information of image data in units of one to several frames in step 28. The white balance control data RGN and BGN are rewritten in such a way as to obtain the computed gains. When the manual white balance control is designated, the process in step 28 (the integration of image data with the white balance control data RGN and BGN and the calculation of the optimal shutter speed and the optimal white balance gains) is executed in the personal computer.

In step 29, the exposure control data IRN, white balance control data RGN and BGN, manual designation data IRM and WBM and size designation data SMS, which have been rewritten as needed, are written into the control data file again. In the subsequent step 30, image data is written in the image data file after which the subroutine is terminated.

The image sensing apparatus is programmed in such a manner that when the manual exposure control is set, the exposure control data IRN in the control data file is rewritten by an exposure suppression command or an exposure progression command regardless of the subroutine process. For instance, the exposure control data IRN is incremented in accordance with the exposure suppression command CLOSE and is decremented in accordance with the exposure progression command OPEN. At the same time as the exposure control data IRN is rewritten, the manual designation data IRM is rewritten to "1" from "0".

When the manual white balance control is set, the white balance control data RGN and BGN are rewritten by an amplification command or an attenuation command for each color component. For example, the white balance control data RGN and BGN are incremented respectively according to the amplification commands R+ and B+ corresponding to the R and B components, and are decremented respectively according to the attenuation commands R− and B−. At the same time as the white balance control data RGN and BGN are rewritten, the manual designation data WBM is rewritten to "1" from "0".

When the manual exposure control and white balance control are set, as apparent from the above, the automatic setting of the exposure control data IRN and white balance control data RGN and BGN is not executed in the subroutine process. The personal computer normally supplies those exposure control data IRN and white balance control data RGN and BGN to the image sensing apparatus. The image sensing apparatus retains those data IRN, RGN and BGN in its own command register (which will be discussed later) and operates in accordance with those data IRN, RGN and BGN.

Figure 4:
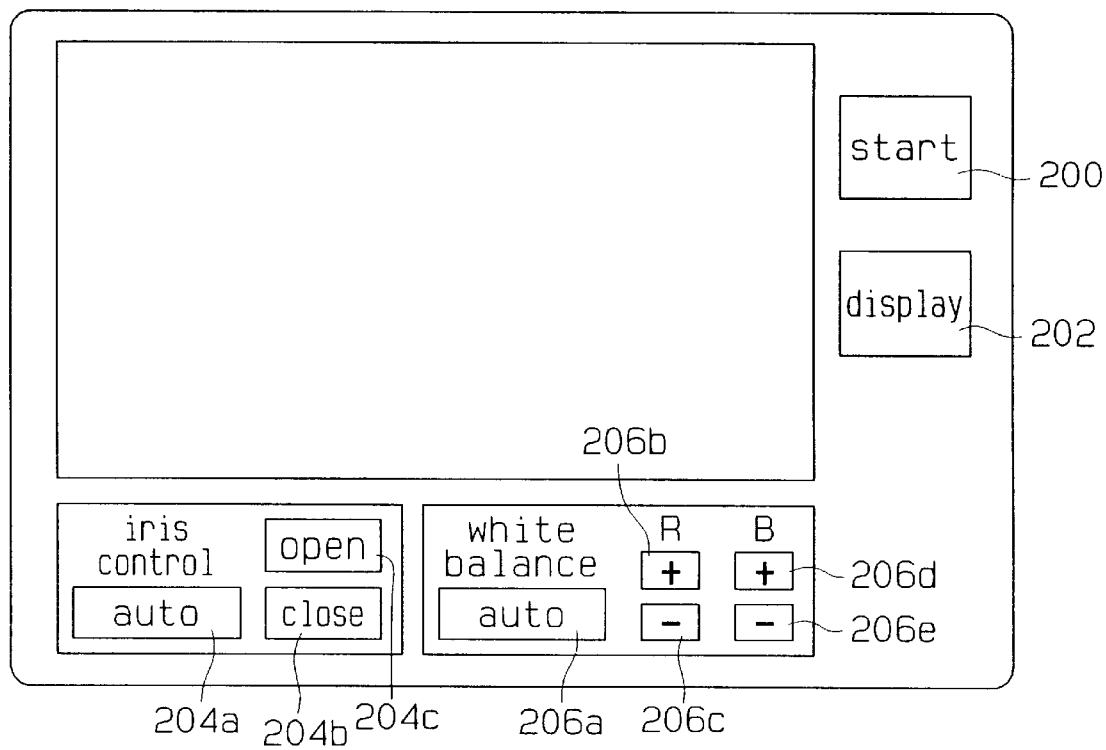
FIG. 4 is a diagram depicting various kinds of control buttons for the image sensing apparatus, which are displayed on the monitor screen of a personal computer.

As shown in FIG. 4, various control buttons are displayed on the monitor screen of the personal computer to allow the personal computer to control the image sensing apparatus. When an operator clicks an arbitrary control button, the personal computer executes a command associated with the control button. For instance, a display button 202 for establishing the display screen, various buttons 204a to 204c for exposure control and various buttons 206a to 206e for white balance control are displayed on the screen. Image data output from the image sensing apparatus are also displayed on the screen.

According to this embodiment, various control conditions can be set or the set conditions can be altered while the personal computer is running the control program for the image sensing apparatus. This improves the responsiveness of the image sensing apparatus. As digital image data output from the image sensing apparatus are normally displayed on the monitor screen, the operator can set the conditions while viewing the data being sensed on the screen. This facilitates the control of the image sensing apparatus connected to the computer machine.

Figure 5:
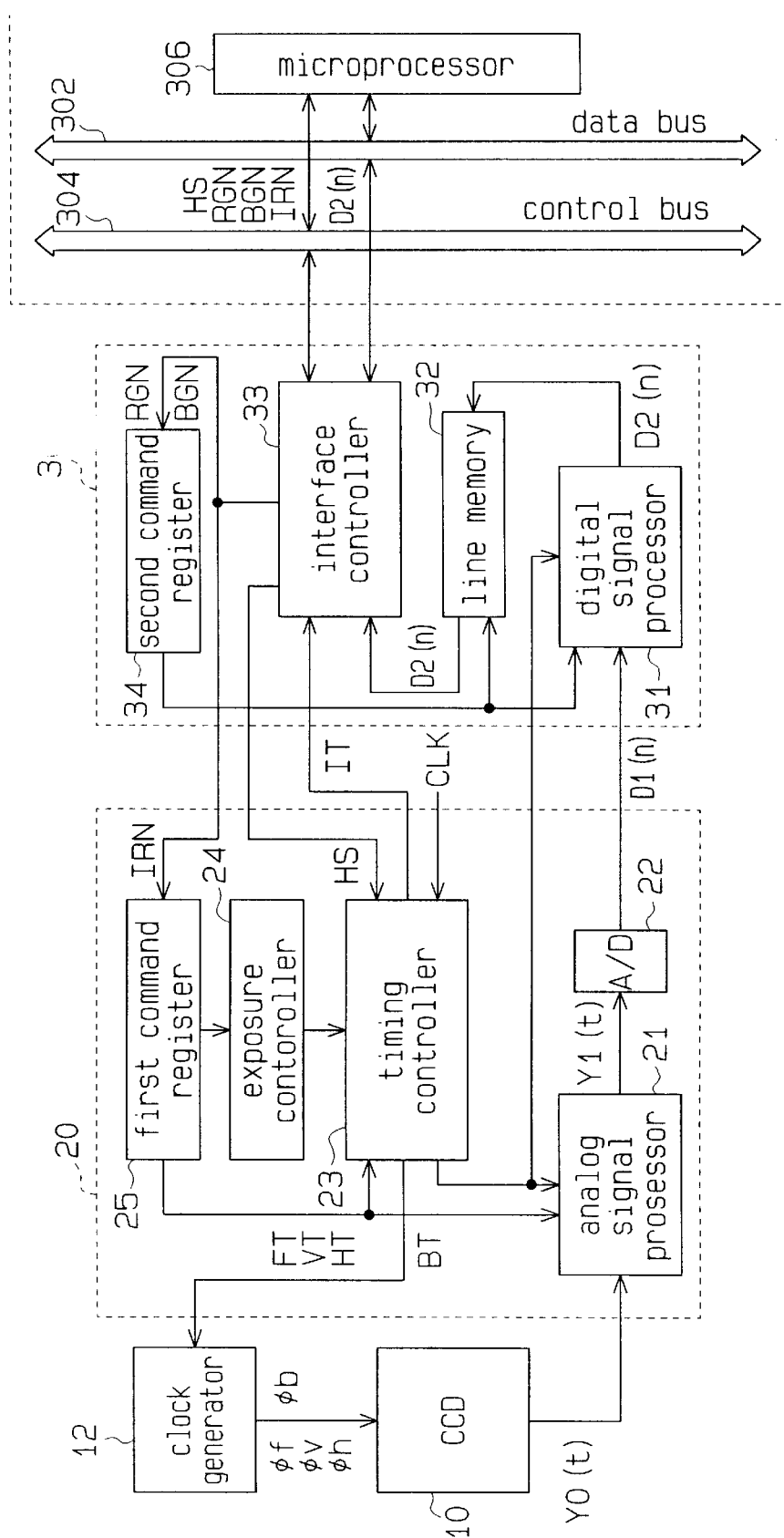
FIG. 5 is a block diagram showing an image sensing apparatus whose operation can be controlled by a personal computer.

As shown in FIG. 5, the image sensing apparatus designed to be controlled by the control method according to this invention comprises a frame transfer type CCD solid state image sensor 10, a clock generator 12 and first and second control units 20 and 30.

Figure 6:
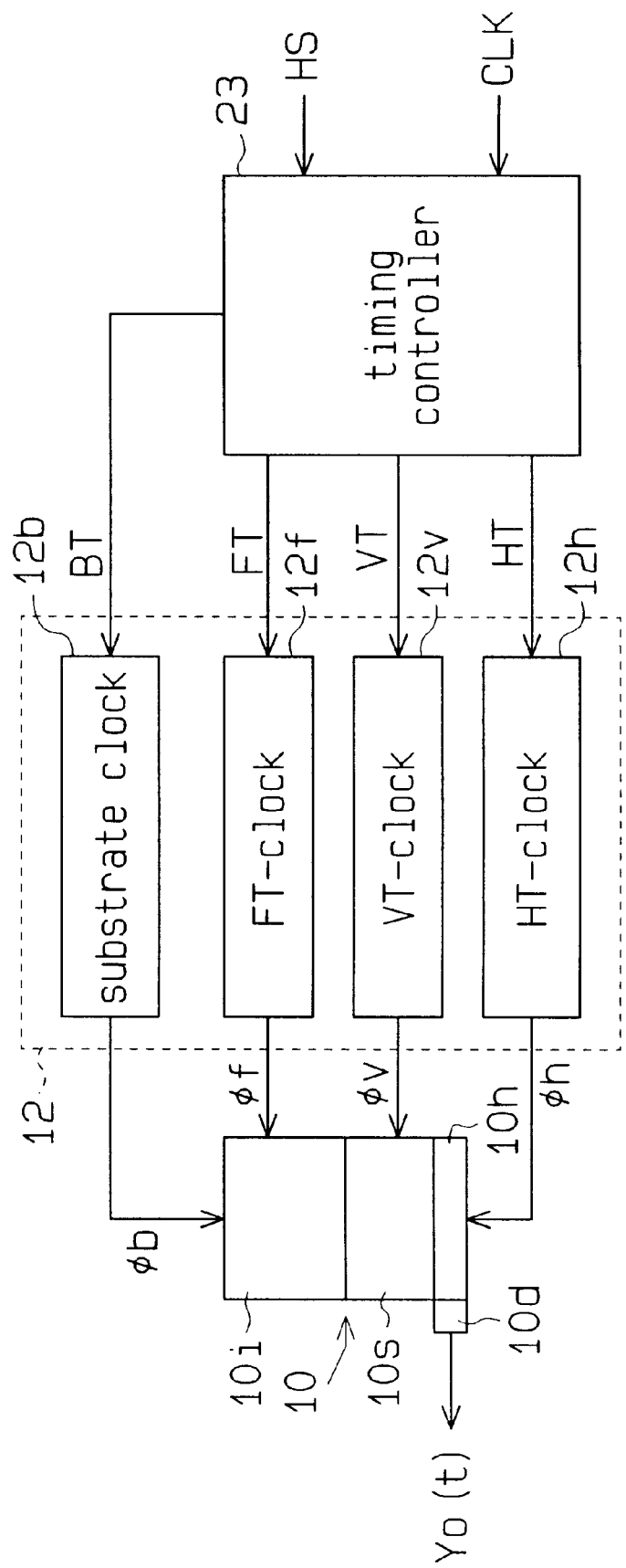
FIG. 6 is a block diagram illustrating a solid state image sensor and a clock generator in the image sensing apparatus.

As shown in FIG. 6, the CCD solid state image sensor 10 includes a light receiving section 10i, a storage section 10s, a horizontal transfer section 10*h* and an output section 10*d*. The light receiving section 10*i* is comprised of a plurality of shift registers arranged in parallel in the horizontal direction, each shift register having a plurality of bits that are continuously laid out vertically. The individual bits of each shift register form light receiving pixels for storing (retaining) information charges, which are produced by the reflected light from the object to be sensed. The storage section 10*s* is comprised of a plurality of shift registers, which are continuous with respect to the shift registers of the light receiving section 10*i*. The number of bits of each shift register of the storage section 10*s* is set so as to match with the number of bits of each shift register of the light receiving section 10*i*. The storage section 10*s* with this structure temporarily stores one screen of information charges transferred from the light receiving section 10*i*.

The horizontal transfer section 10*h* comprises by a single shift register, which has a plurality of bits respectively connected to the individual outputs of the shift registers of the storage section 10*s*. The horizontal transfer section 10*h* receives one screen of information charges stored in the storage section 10*s* line by line and sequentially sends those information charges to the output section 10*d*. The output section 10*d* includes an electrically independent capacitor for receiving the information charges from the horizontal transfer section 10*h* pixel by pixel and an amplifier, which detects a potential change in the capacitor to produce a voltage value signal or an analog image signal Y0(t).

The clock generator 12 includes a frame transfer clock generation section 12*f*, a vertical transfer clock generation section 12*v*, a horizontal transfer clock generation section 12*h* and a substrate clock generation section 12*b*. The operations of the individual sections 12*f*, 12*v*, 12*h* and 12*b* will now be discussed referring to FIGS. 6 and 7. The frame transfer clock generation section 12*f* produces a frame transfer clock signal Øf in response to a frame transfer timing signal FT and supplies this signal Øf to the light receiving section 10*i*. The light receiving section 10*i* promptly transfers the information charges to the storage section 10*s* in response to the frame transfer clock signal Øf.

The vertical transfer clock generation section 12*v* produces a vertical transfer clock signal Øv in response to a vertical scan timing signal VT from a timing controller 23 and supplies this signal Øv to the storage section 10*s*. In response to the vertical clock signal Øs, the storage section 10*s* receives the information charges from the light receiving section 10*i* and transfers one screen of information charges received to the horizontal transfer section 10*h* line by line.

The horizontal transfer clock generation section 12*h* produces a horizontal transfer clock signal Øh in response to a horizontal scan timing signal HT from the timing controller 23 and supplies this signal Øh to the horizontal transfer section 10*h*. In response to the horizontal transfer clock signal Øh, the horizontal transfer section 10*h* receives one line of information charges transferred from the storage section 10*s* and sequentially transfers the information charges to the output section 10*d*. The analog image signal Y0(t) is supplied as the output of the CCD solid state image sensor 10 to an analog signal processor 21 from the output section 10*d*. The horizontal transfer clock generation section 12*h* further produces a reset clock signal Ør and sends it to the output section 10*d*. In response to the reset clock signal Ør, the output section 10*d* discharges one bit of information charge stored in its own capacitor in synchronism with the horizontal transfer clock signal Øh.

The substrate clock generation section 12*b* produces a substrate clock signal Øb in response to a discharge timing signal BT from the timing controller 23, and applies this signal to the substrate of the solid state image sensor 10. This substrate clock signal Øb holds an H level for a predetermined period during the vertical scan period. The light receiving section 10*i* discharges the stored information charges in response to the substrate clock signal Øb.

Figure 7:
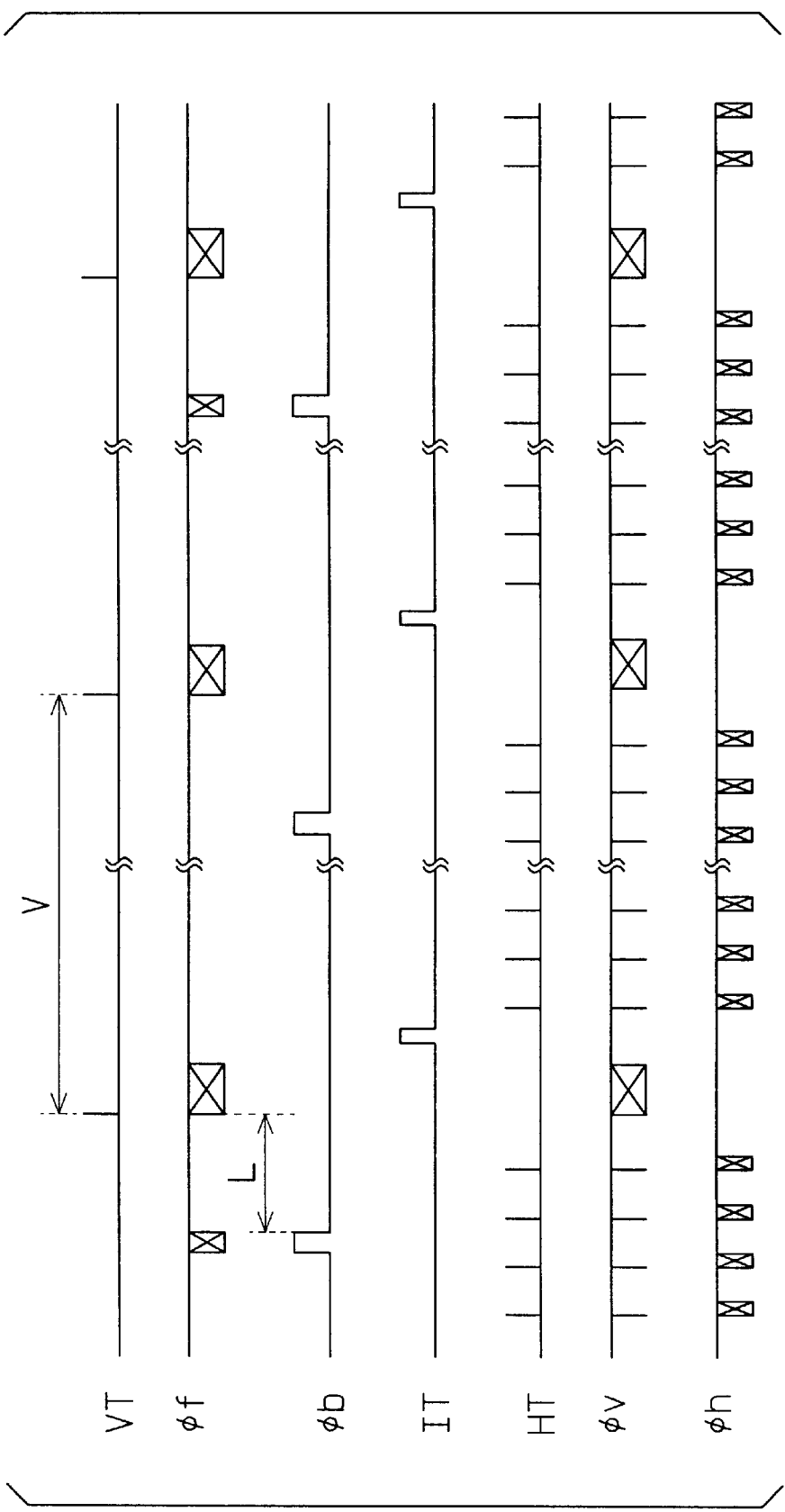
FIG. 7 is a timing chart for explaining the operation of the image sensing apparatus in FIG. 5.

As shown in FIG. 7, therefore, the information charge storage time of the light receiving section 10*i* is indicated by a period L from the completion of the discharging of the information charges by the substrate clock signal Øb to the beginning of the transfer operation of the information charges by the frame transfer clock signal Øf. Altering the supply timing for this substrate clock signal Øb allows the information charge storage period or the shutter speed to be controlled. In other words, the period L is variably set so that the CCD solid state image sensor 10 is always held in the proper exposure state. While the substrate clock signal Øb is holding the H level, the transfer operation by the frame transfer clock signal Øf is also executed. This permits efficient discharging of information charges.

Referring again to FIG. 5, the first control unit 20 includes the analog signal processor 21, an A/D converter 22, the timing controller 23, an exposure controller 24 and a first command register 25, which are all integrated in the control unit 20.

The analog signal processor 21 performs signal processing, such as sampling and holding of the analog image signals Y0(t) output from the solid state image sensor 10 and automatic gain control (AGC), in accordance with control data stored in the first command register 25, thereby producing processed analog image signals Y1(t). In synchronism with the drive timing of the solid state image sensor 10, the A/D converter 22 receives the analog image signals Y1(t) output from the analog signal processor 21, and performs digital/analog conversion of the analog image signals Y1(t) pixel by pixel to produce digital image data signals D1(n).

The timing controller 23 produces the frame transfer timing signal FT in accordance with a reference clock CLK having a given period, and supplies this signal to the clock generator 12. The timing controller 23 also sends the personal computer an interrupt signal IT indicating that the outputting of one screen of information charges by the solid state image sensor 10 is enabled. The period V of this frame transfer timing signal FT is determined by a command stored in the first command register 25 and corresponds to the vertical scan period of the solid state image sensor 10. The clock generator 12 supplies the frame transfer clock signal Øf to the light receiving section 10*i* in response to the rising of the frame transfer timing signal FT. Consequently, the information charges are transferred to the storage section 10*s* from the light receiving section 10*i*.

The timing controller 23 receives a line feed trigger HS supplied from the personal computer and produces the vertical scan timing signal VT in response to the line feed trigger HS. The clock generator 12 supplies the vertical clock signal Øs to the storage section 10*s* in response to the rising of the vertical scan timing signal VT. As a result, information charges are transferred to the horizontal transfer section 10*h* from the storage section 10*s* line by line.

The timing controller 23 produces the discharge timing signal BT, in accordance with an instruction from the exposure controller 24, and supplies this signal to the clock generator 12. In response to this discharge timing signal BT, the clock generator 12 produces the substrate clock signal Øb, which retains the H level for a predetermined period, and clocks the frame transfer clock signal Øf. As a result, the information charges in the solid state image sensor 10 are discharged. The exposure controller 24 determines the rising timing of the discharge timing signal BT, which is produced by the timing controller 23, in accordance with the exposure control data IRN stored in the first command register 25.

The first command register 25 receives various kinds of control data supplied from the personal computer and supplies those data to the timing controller 23 and the analog control processor 21. The control data includes data that designate the operation timing of the timing controller 23 and the processing conditions of the analog signal processor 21.

The second control unit 30 includes a digital signal processor 31, a line memory 32, an interface controller 33 and a command register 34, which are all integrated in the second control unit 30.

The digital signal processor 31 receives digital image data signals D1(n), output from the A/D converter 22, and performs digital signal processing on the digital image data signals D1(n), such as color separation, matrix operation and white balance adjustment, to produce image data signals D2(n) consisting of the luminance component and color difference component (or R, G and B color components). In the matrix operation, for example, the luminance component is produced by the combination of the individual color separated components. Color components corresponding to predetermined colors (R, G, B) are produced by subtraction or addition of the individual color separated components. Subtracting the luminance component from the individual produced color components yields the color difference components. In adjusting the white balance, the gains for the individual color difference components are individually set in accordance with the white balance control data RGN and BGN, thus permitting the adjustment of the visual color balance for the reproduced image.

The line memory 32 stores one line of image data signals D2(n) from the digital signal processor 31, which have undergone digital signal processing. This line memory 32, comprises of, for example, a FIFO type buffer, operates in such a manner that the data write timing is synchronous with the processing operation of the digital signal processor 31 and the read timing is synchronous with the data latching operation of the personal computer. The number of bits of the line memory 32 is set in accordance with the data output format. The typical data output format for personal computers is the 16-bit structure, where 8 bits are assigned to the luminance component and 8 bits are assigned to the color difference component, or the 15-bit structure, where 5 bits are assigned to each of the R, G and B color components. In this case, the number of bits of the line memory 32 is set to 16 bits.

The interface controller 33 reads the image data signals D2(n) from the line memory 32 line by line in the period according to the latching frequency on the personal computer side, and sends the signals D2(n) to a data bus 302 of the personal computer. At the same time, the interface controller 33 receives the interrupt signal IT from the timing controller 23 and sends the signal to a control bus 304 of the personal computer. Further, the interface controller 33 receives the line feed trigger HS from a microprocessor 306 of the personal computer via the control bus 304, and supplies the line feed trigger HS to the timing controller 23.

The interface controller 33 receives various commands and control data from the microprocessor 306 via the control bus 304, and stores those into the first and second command registers 25 and 34. The second command register 34 stores various commands and control data (white balance control data RGN and BGN), and sends those commands and control data to the digital signal processor 31 and the line memory 32. Various commands include data which designates the processing conditions of the digital signal processor 31 and the write period of the line memory 32.

It is apparent from the above that the image sensing apparatus operates in accordance with various control commands from the personal computer which are stored in the first and second command registers 25 and 34. This design permits the operation of the image sensing apparatus to be controlled by the personal computer.

Figure 8:
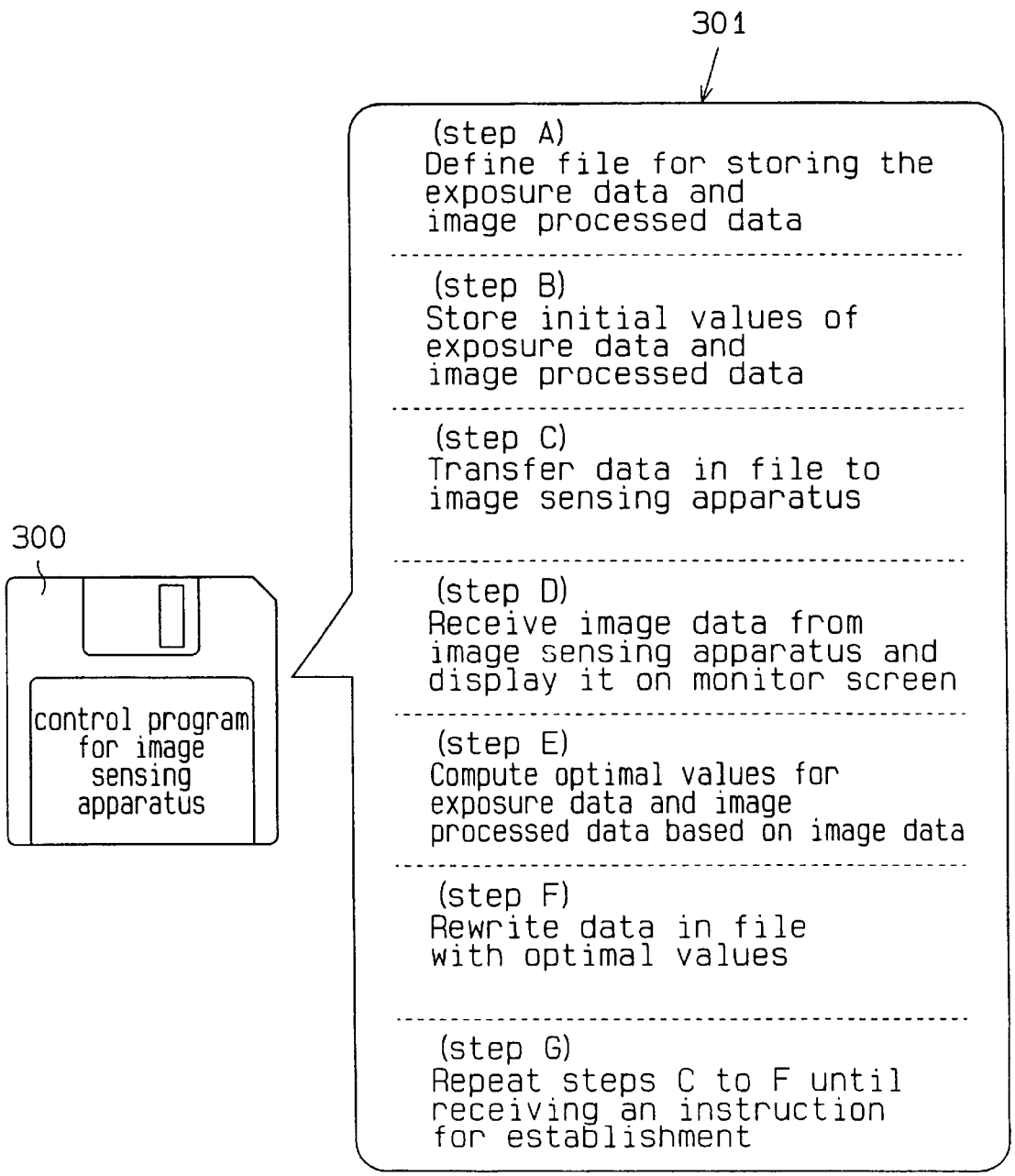
FIG. 8 is a diagram illustrating the individual steps of a control program recorded on a magnetic disk as a storage medium.

FIG. 8 shows a magnetic disk as a storage medium where the control program for the image sensing apparatus of this invention is recorded.

Figure 1:
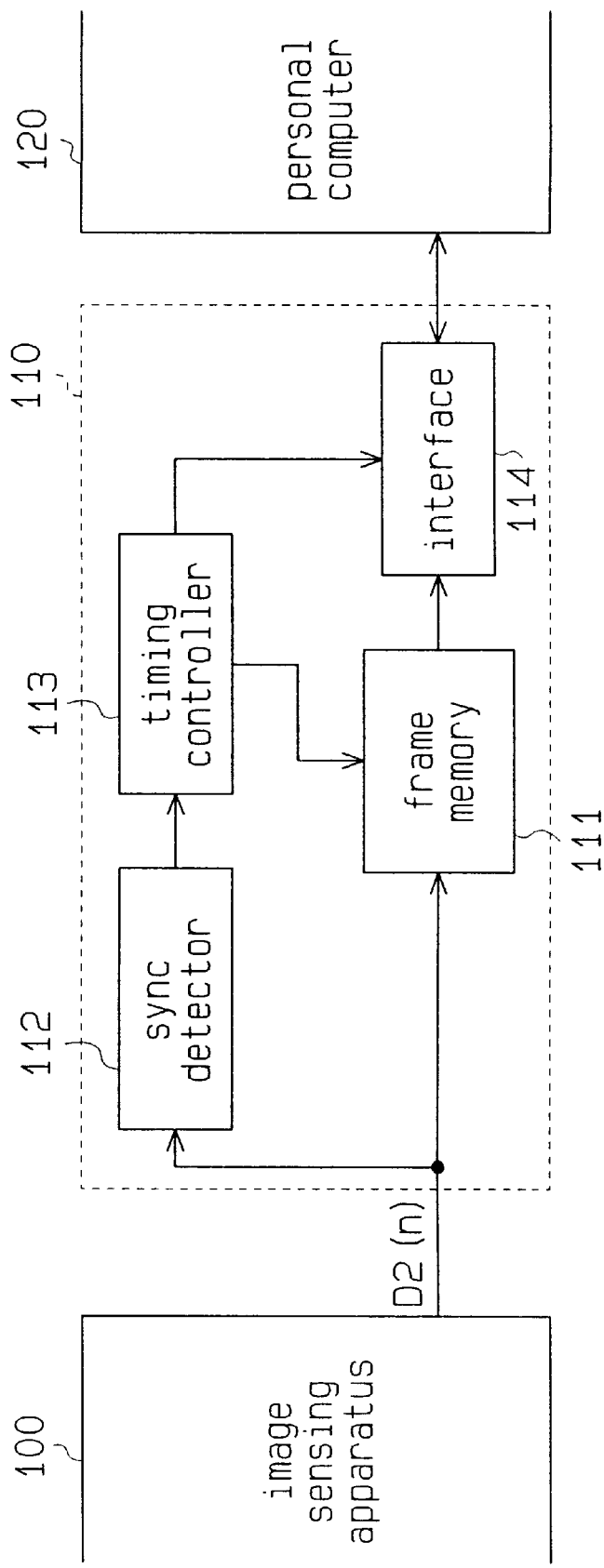
FIG. 1 is a block diagram showing a conventional video capture unit provided between an image sensing apparatus and a personal computer.

A recording medium 300 is a magnetic disk like a floppy disk where a control program 301 readable by a personal computer is recorded. The control program 301 permits the personal computer to control the solid state image sensor according to the flowchart shown in FIG. 1 and includes steps A to G.

In step A, a given area is secured in the memory space of the personal computer, and a control data file for storing the exposure control data IRN, white balance control data RGN and BGN, etc. is defined as shown in FIG. 3. In step B, the initial values of the exposure control data IRN, and white balance control data RGN and BGN are stored in the control data file defined in step A. The initial values set standard conditions for the image sensing apparatus. In step C, the exposure control data IRN and white balance control data RGN and BGN stored in the control data file are read out and transferred to the image sensing apparatus connected to the personal computer. Accordingly, the image sensing apparatus executes the image sensing operation based on the exposure control data IRN and produces image data based on the white balance control data RGN and BGN.

In step D, the personal computer receives image data from the image sensing apparatus and displays an image corresponding to the image data as a reduced screen on the screen of the monitor connected to the personal computer. In step E, the optimal values for the exposure control data IRN and white balance control data RGN and BGN are computed by referring to the image data input from the image sensing apparatus. For example, the luminance component of the image data is integrated screen by screen, and the exposure control data IRN corresponding to the difference between the integral value and the reference value in the optimal exposure status is calculated. The color components of the image data are averaged over one to several screens, and white balance control data RGN and BGN corresponding to the difference between the average value and the reference value in the optimal balance status are calculated. In step F, the optimal values of the exposure control data IRN and white balance control data RGN and BGN, calculated in step E, are newly stored in the control data file. Although old exposure control data IRN and old white balance control data RGN and BGN are stored in the control data file, those data are renewed by overwriting them with new exposure control data IRN and white balance control data RGN and BGN.

In step G, the steps C, D, E and F are repeated by the personal computer while and until an instruction for establishment sent to the personal computer from an input device like a keyboard or a mouse is received. When the establishment instruction is input, the processes in steps C to F are terminated, and an image according to one screen of image data input from the image sensing apparatus at that time is displayed on the screen of the monitor connected to the personal computer. At this time, the image is displayed wide on the monitor screen unlike in the display of step D.

Such a recording medium 300 can supply the control program to the personal computer and can permit the personal computer to give an instruction for the image sensing operation or the signal processing to the image sensing apparatus. The recording medium having the control program of this invention stored thereon is not limited to a magnetic disk, but may be an optical disk, a magnetic-optical disk or a magnetic tape.

Although only one embodiment of the present invention has been described herein, it should be apparent to those skilled in the art that the present invention may be embodied in many other specific forms without departing from the spirit or scope of the invention. Particularly, it should be understood that the invention may be embodied in the following forms.

Particularly, this invention may be modified to allow the personal computer to designate the size reduction or the like in order to control the size of image data of the image sensing apparatus instead of causing the personal computer to perform the exposure control and white balance control of the image sensing apparatus.

Therefore, the present examples and embodiment are to be considered as illustrative and not restrictive and the invention is not to be limited to the details given herein, but may be modified within the scope and equivalence of the appended claims.

What is claimed is:

1. A method of controlling an image sensing apparatus from a computer machine, said image sensing apparatus having a solid state image sensor having a plurality of light receiving pixels arranged in a matrix form, said image sensor producing an image sensed output signal in accordance with a predetermined drive timing and performing signal processing on said image sensed output signal in accordance with predetermined processing conditions to thereby produce image data signals screen by screen, said method comprising the steps of:

defining a control data file for storage of exposure data and image processing data to be supplied to said image sensing apparatus from said computer machine, said exposure data being used to designate a drive timing of said solid state image sensor, said image processing data being used to designate processing conditions for said image sensed output signal;

storing initial values of said exposure data and said image processing data in said control data file;

supplying said exposure data and said image processing data stored in said control data file to said image sensing apparatus, said solid state image sensor producing said image sensed output signal in accordance with said exposure data, said image sensing apparatus producing said image data signals in accordance with said image processing data;

receiving said image data signals from said image sensing apparatus screen by screen and displaying an image corresponding to said image data signals on a monitor screen;

computing optimal values of said exposure data and said image processing data for each of a drive timing of said solid state image sensor and processing conditions of said image data signals based on said image data signals;

resetting said exposure data and said image processing data to said optimal values; and repeating said supply step, said display step, said computation step and said resetting step to display said image on said monitor screen in a given period until a command to establish production of a specific image data signal is received.

2. The method according to claim 1, wherein said display step includes a step of displaying said image in a reduced size in a partial area of said monitor screen, and said method further includes a step of, after establishment of production of a specific image data signal according to said image establishment command, displaying said established image data in an enlarged size on said monitor screen.

3. The method according to claim 1, wherein said image sensing apparatus has a register for retaining at least one of said exposure data and said image processing data, and said supply step includes a step of supplying at least one of said exposure data and said image processing data to said register.

4. The method according to claim 1, wherein said image processing data includes data for controlling a white balance.

5. A recording medium having a control program for controlling an image sensing apparatus from a computer machine recorded thereon, said image sensing apparatus having a solid state image sensor having a plurality of light receiving pixels arranged in a matrix form, said image sensor producing an image sensed output signal in accordance with a predetermined drive timing, and performing signal processing on said image sensed output signal in accordance with predetermined processing conditions to thereby produce image data signals to be supplied to said computer machine screen by screen, said control program readable by said computer machine comprising the steps of:

defining a control data file for storage of exposure data and image processing data to be supplied to said image sensing apparatus from said computer machine, said exposure data being used to designate a drive timing of said solid state image sensor, said image processing data being used to designate processing conditions for said image sensed output signal;

storing initial values of said exposure data and said image processing data in said control data file;

supplying said exposure data and said image processing data stored in said control data file to said image sensing apparatus, said solid state image sensor producing said image sensed output signal in accordance with said exposure data, said image sensing apparatus producing said image data signals in accordance with said image processing data;

receiving said image data signals from said image sensing apparatus screen by screen and displaying an image corresponding to said image data signals on a monitor screen;

computing optimal values of said exposure data and said image processing data for each of a drive timing of said solid state image sensor and processing conditions of said image data signals based on said image data signals;

resetting said exposure data and said image processing data, stored in said control data file, to said optimal values; and repeating said supply step, said display step, said computation step and said resetting step to display said image on said monitor screen in a given period until a command to establish production of a specific image data signal is received.

6. The recording medium according to claim 5, wherein said control program further includes a step of receiving said image data signals and displaying said image in an enlarged size on said monitor screen in response to a command for establishing production of a specific image data signal.

* * * * *